(12) United States Patent
Klodowski

(10) Patent No.: US 9,973,123 B2
(45) Date of Patent: May 15, 2018

(54) SYSTEM AND METHOD FOR CONTROLLING A GENERATOR

(71) Applicant: General Electric Company, Schenectady, NY (US)

(72) Inventor: Anthony Michael Klodowski, Hardy, VA (US)

(73) Assignee: General Electric Company, Schenectady, NY (US)

( * ) Notice: Subject to any disclaimer, the term of this patent is extended or adjusted under 35 U.S.C. 154(b) by 16 days.

(21) Appl. No.: 15/071,327

(22) Filed: Mar. 16, 2016

(65) Prior Publication Data

US 2017/0272015 A1 Sep. 21, 2017

(51) Int. Cl.
*F03D 9/00* (2016.01)
*H02P 9/04* (2006.01)
*H02P 9/00* (2006.01)
*H02P 11/00* (2006.01)
*H02H 7/06* (2006.01)

(52) U.S. Cl.
CPC .............. *H02P 9/008* (2013.01); *F03D 9/002* (2013.01); *H02P 9/007* (2013.01)

(58) Field of Classification Search
USPC ........................................ 290/44, 55; 322/24
See application file for complete search history.

(56) References Cited

U.S. PATENT DOCUMENTS

| 5,066,866 A * | 11/1991 | Hallidy | H02J 7/1438 |
| | | | 290/1 R |
| 5,811,957 A * | 9/1998 | Bose | H02P 21/24 |
| | | | 318/802 |
| 7,425,771 B2 * | 9/2008 | Rivas | F03D 7/0224 |
| | | | 290/44 |
| 7,830,127 B2 * | 11/2010 | Corcelles Pereira | H02J 3/1807 |
| | | | 322/24 |
| 8,035,240 B2 * | 10/2011 | Erdman | H02P 9/007 |
| | | | 290/44 |
| 8,183,704 B2 * | 5/2012 | Rivas | F03D 7/0224 |
| | | | 290/44 |

(Continued)

OTHER PUBLICATIONS

Ehrenberg, Digitally Controlled Wind Turbines in Megawatt Size With Doubly-fed Induction Generator Without Position Sensor, Vestas Wind Systems, http://control-design.de/home_eng/Applications/Windenergy/body_windenergy.html, pp. 1-11.

*Primary Examiner* — Pedro J Cuevas
(74) *Attorney, Agent, or Firm* — Dority & Manning, P.A.

(57) ABSTRACT

The present subject matter is directed to a method for controlling a generator of an electrical power system. The generator includes a generator stator magnetically coupled to a generator rotor. The method includes operating the generator stator of the generator at a first voltage level. Another step includes monitoring, via one or more sensors, at least one of a rotor speed or a rotor voltage of the generator rotor. The method also includes reducing the first voltage level of the generator stator by a predetermined percentage when the rotor speed is within a low speed range or the rotor voltage exceeds a predetermined threshold so as to increase an operating range of the rotor speed. Thus, the increased operating range of the rotor speed increases power production of the electrical power system in the low speed range.

18 Claims, 10 Drawing Sheets

(56) References Cited

U.S. PATENT DOCUMENTS

| | | | | |
|---|---|---|---|---|
| 8,207,623 B2* | 6/2012 | Rivas | F03D 7/0224 | 290/44 |
| 8,264,094 B2* | 9/2012 | Rivas | F03D 7/0224 | 290/44 |
| 8,294,288 B2* | 10/2012 | Rivas | F03D 7/0224 | 290/44 |
| 8,395,336 B2* | 3/2013 | Lai | H02P 21/09 | 318/400.02 |
| 9,739,841 B2* | 8/2017 | Berroteran Gil | G01R 31/42 | |
| 9,745,957 B2* | 8/2017 | Seymour | F03D 7/026 | |
| 2007/0216164 A1* | 9/2007 | Rivas | F03D 7/0224 | 290/44 |
| 2008/0150285 A1* | 6/2008 | Corcelles Pereira | H02J 3/1807 | 290/44 |
| 2008/0157530 A1* | 7/2008 | Corcelles Pereira | H02J 3/18 | 290/44 |
| 2009/0008938 A1* | 1/2009 | Erdman | H02P 9/007 | 290/44 |
| 2009/0167095 A1* | 7/2009 | Rivas | F03D 7/0224 | 307/87 |
| 2009/0278351 A1* | 11/2009 | Rivas | F03D 7/0224 | 290/44 |
| 2009/0278352 A1* | 11/2009 | Rivas | F03D 7/0224 | 290/44 |
| 2011/0018270 A1* | 1/2011 | Corcelles Pereira | H02J 3/1807 | 290/44 |
| 2011/0057443 A1* | 3/2011 | Rivas | F03D 7/0224 | 290/44 |
| 2013/0038061 A1* | 2/2013 | Rivas | F03D 7/0224 | 290/44 |
| 2014/0021720 A1* | 1/2014 | Nelson | H02J 3/386 | 290/44 |
| 2014/0062424 A1* | 3/2014 | Larsen | H02J 3/386 | 322/24 |
| 2016/0065105 A1* | 3/2016 | Hardwicke, Jr. | H02P 9/007 | 290/44 |
| 2017/0257046 A1* | 9/2017 | Schnetzka | H02P 9/007 | |
| 2017/0272014 A1* | 9/2017 | Ren | F03D 9/003 | |

* cited by examiner

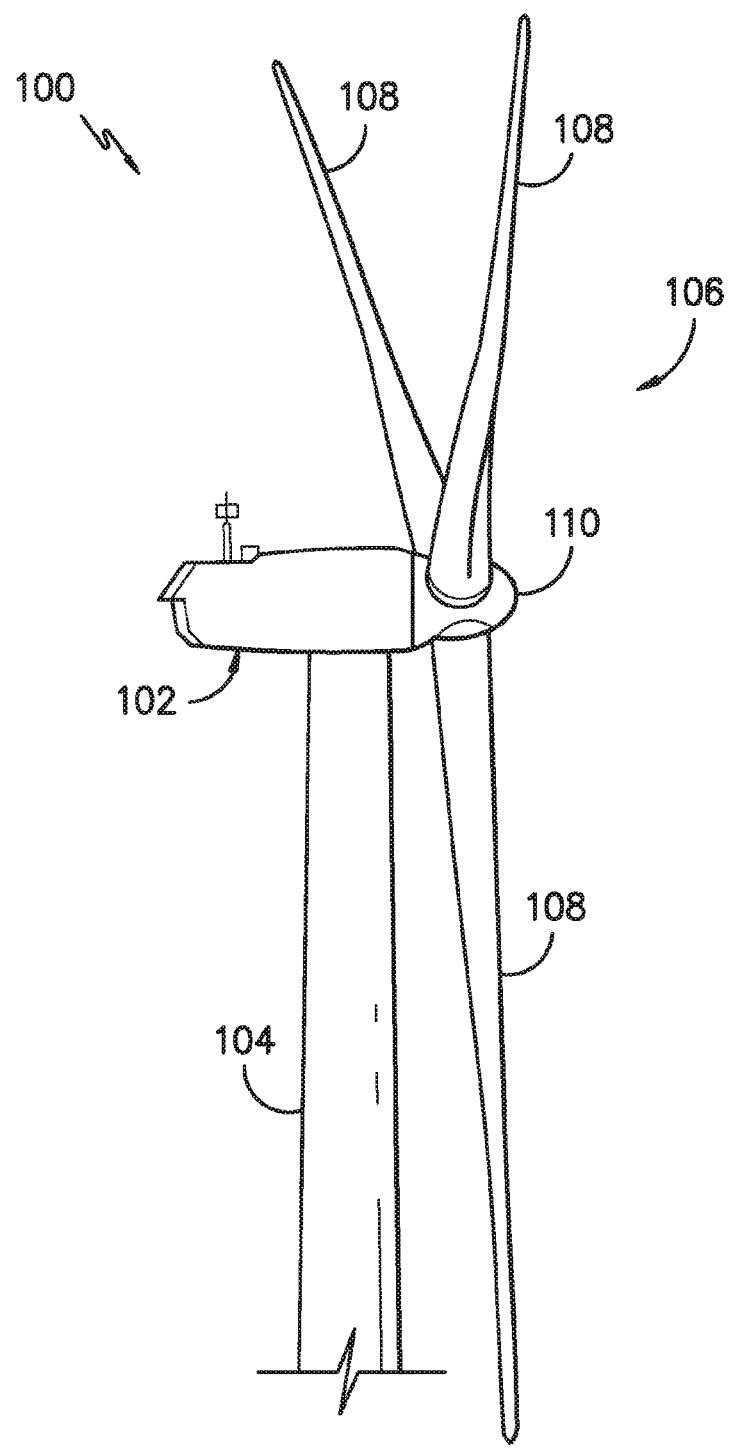
FIG. -1-

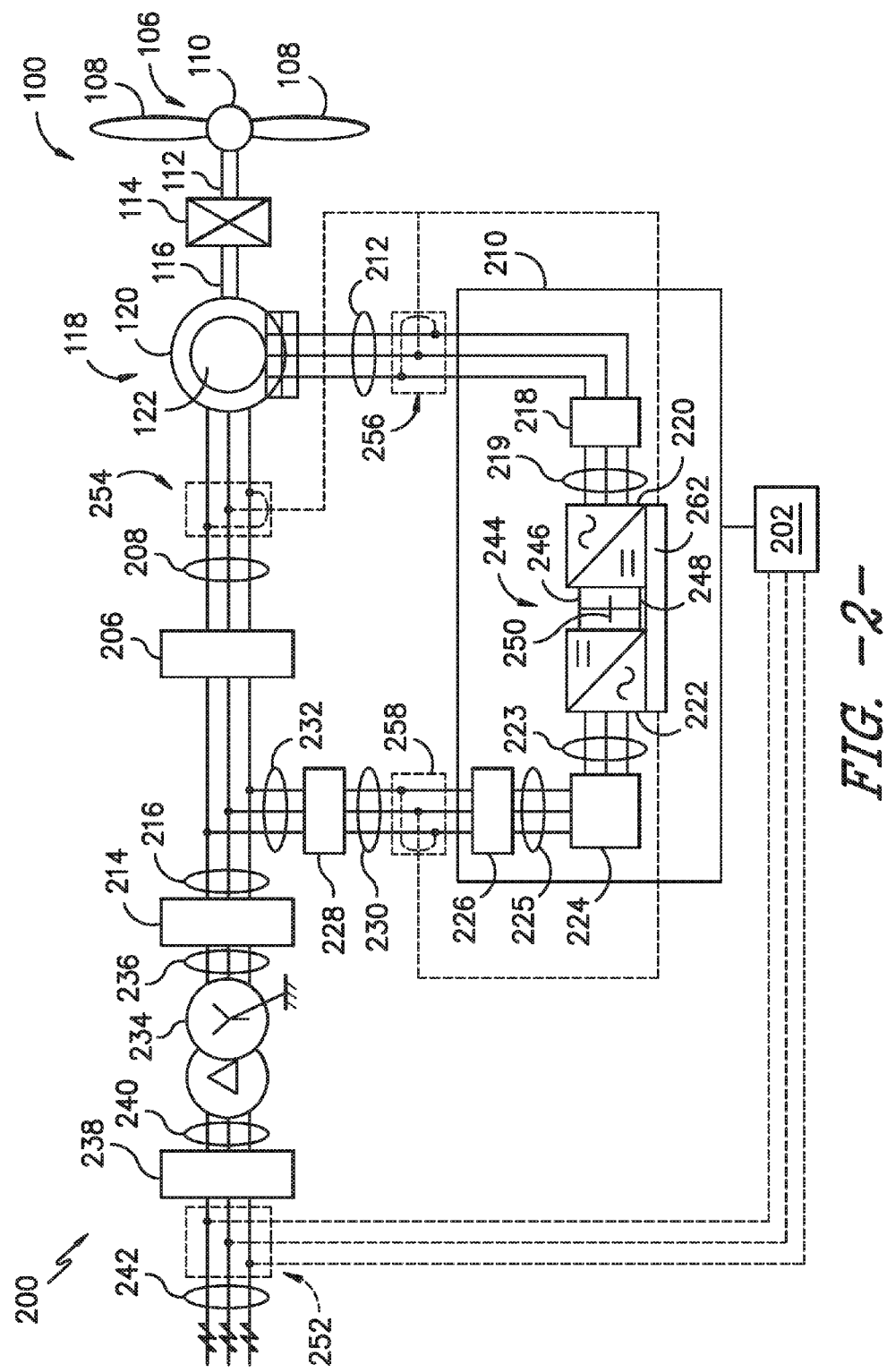
FIG. -2-

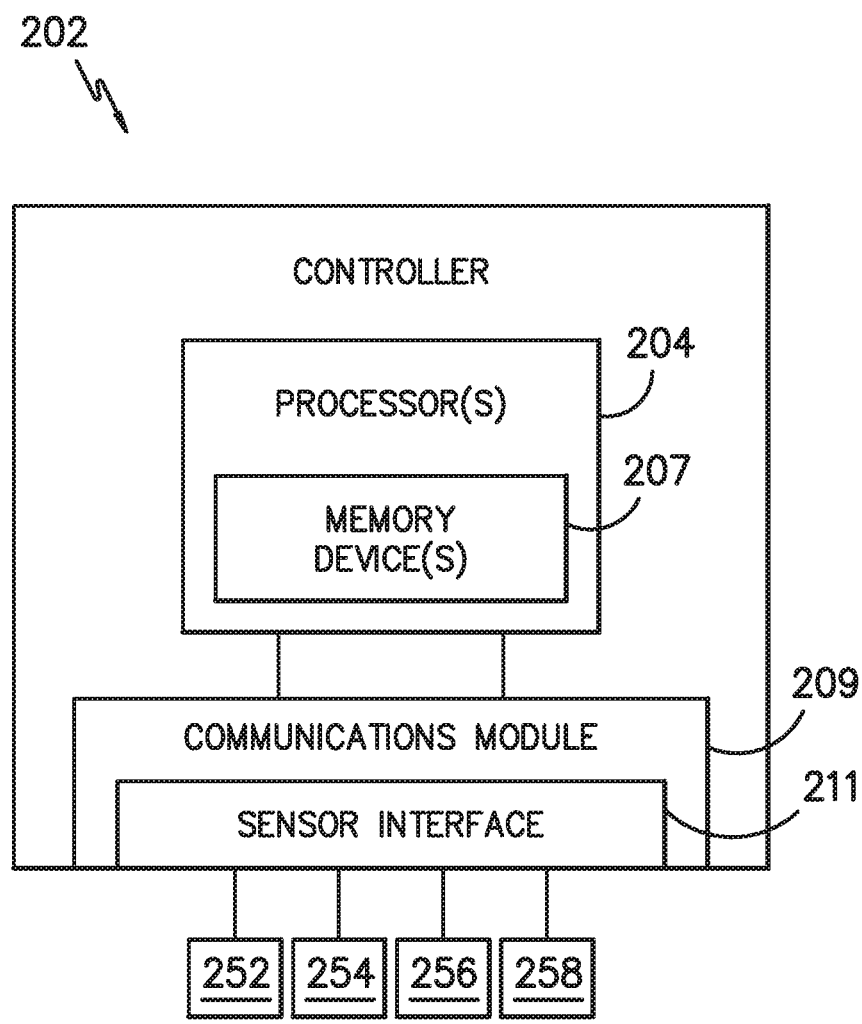
FIG. -3-

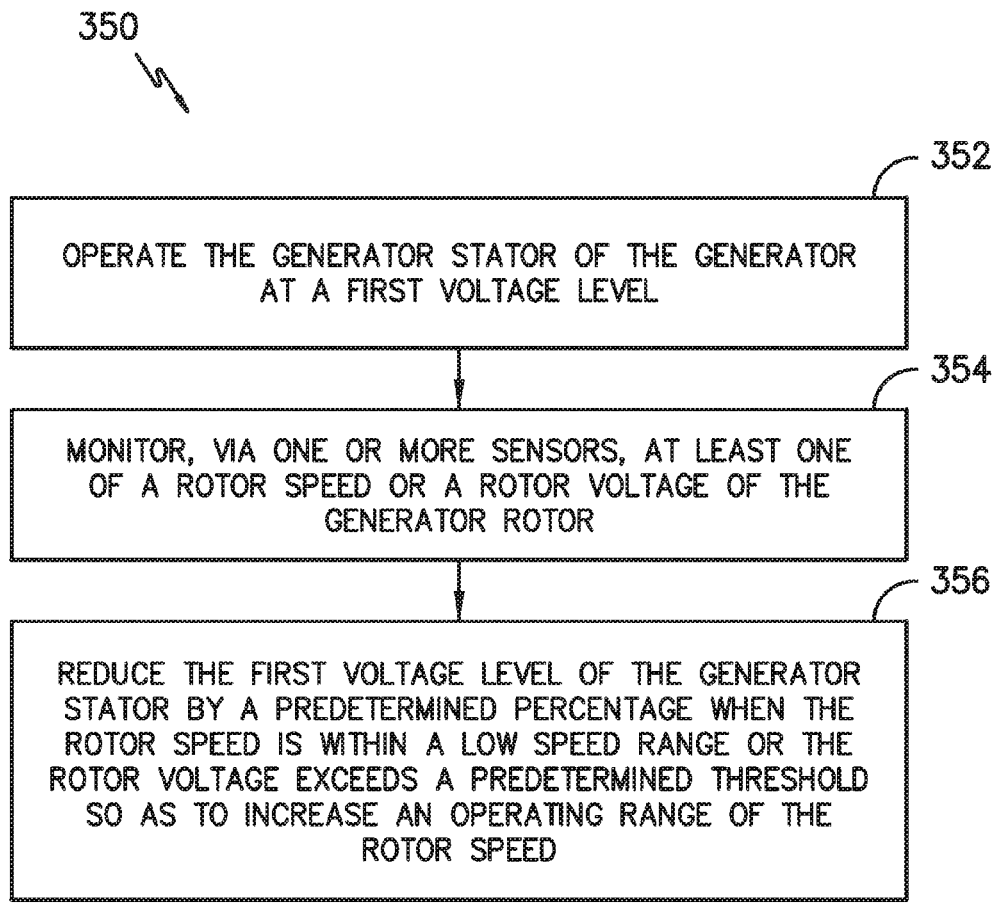
FIG. -4-

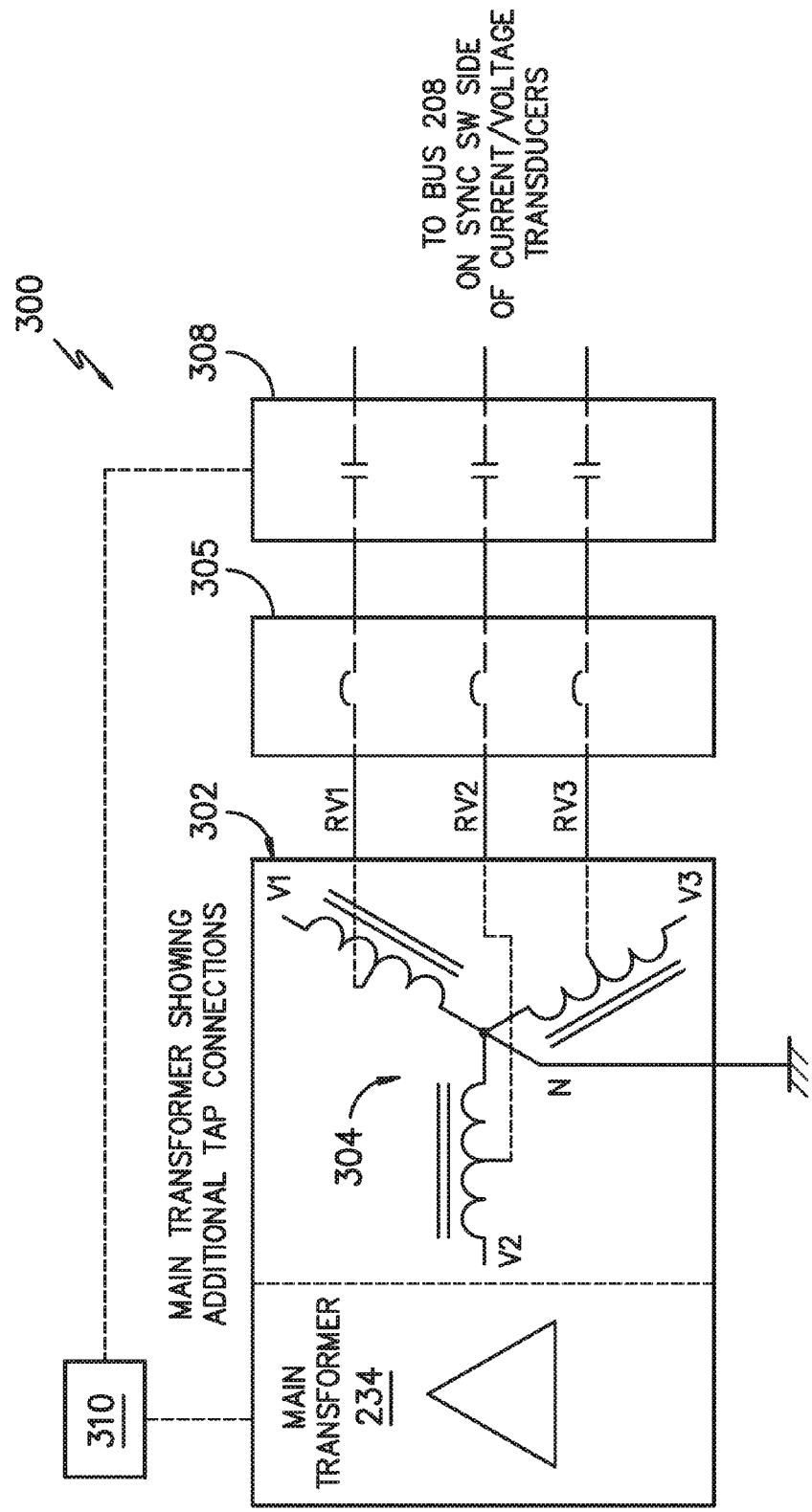

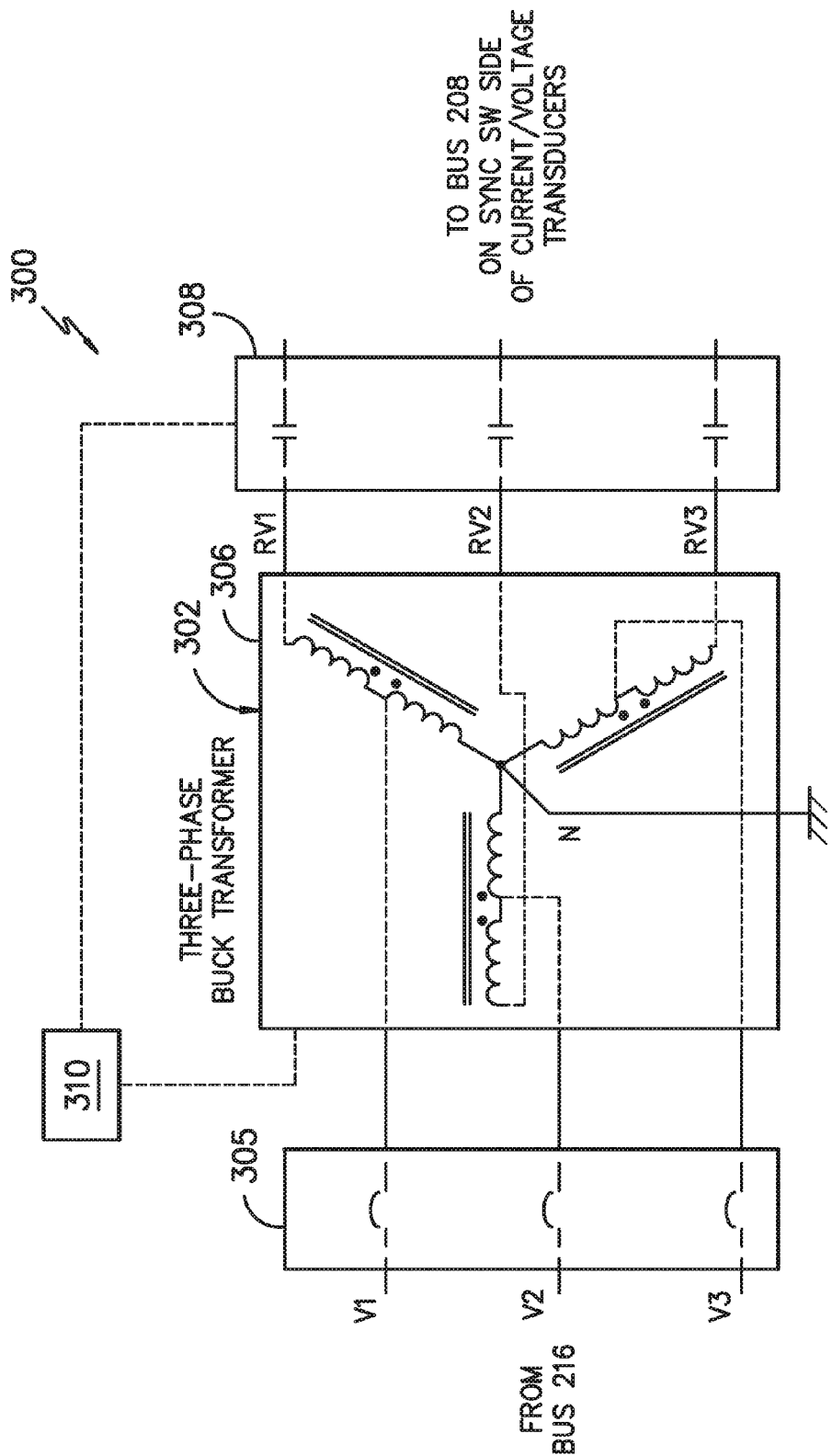
FIG. -6-

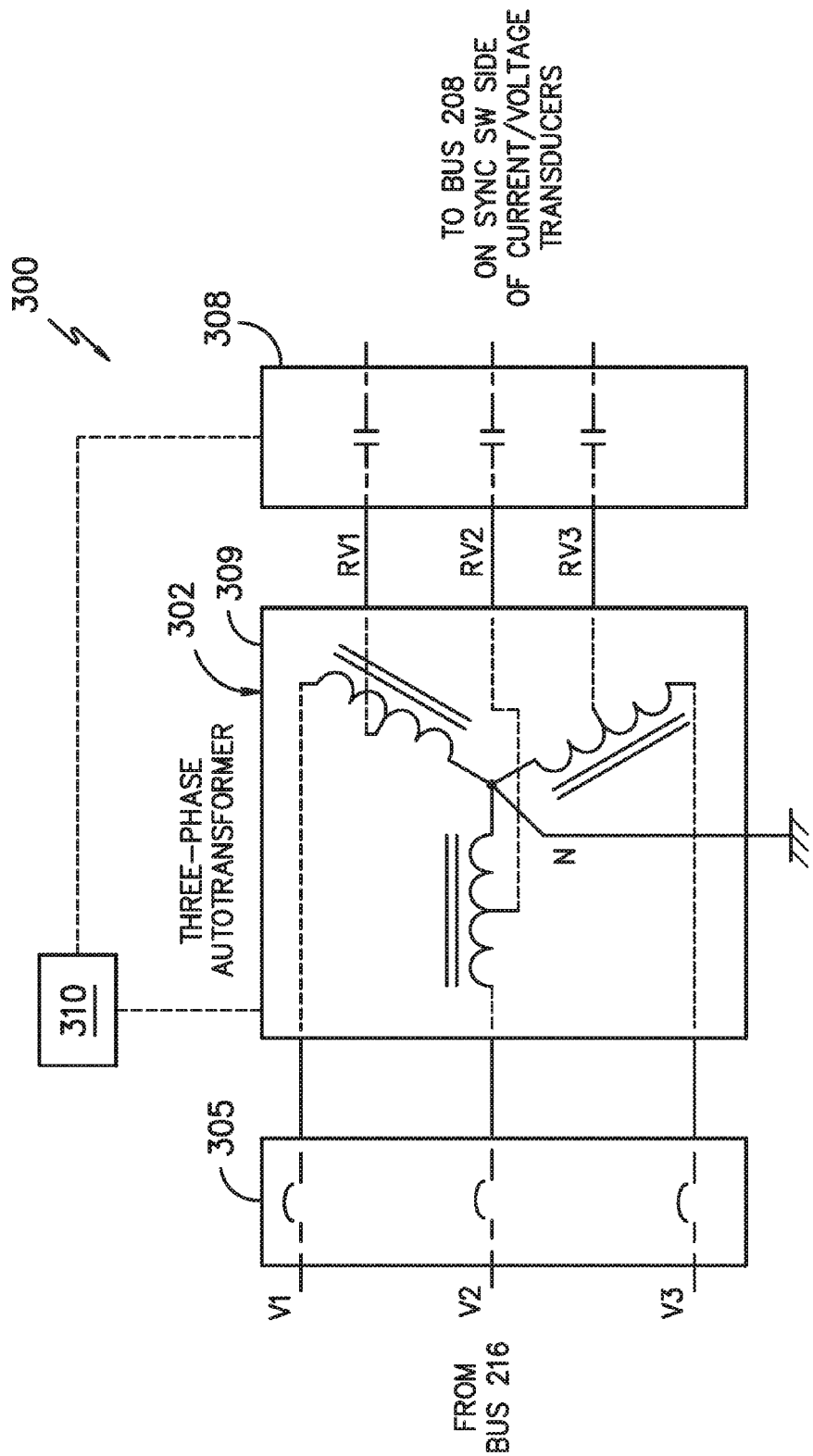
FIG. -7-

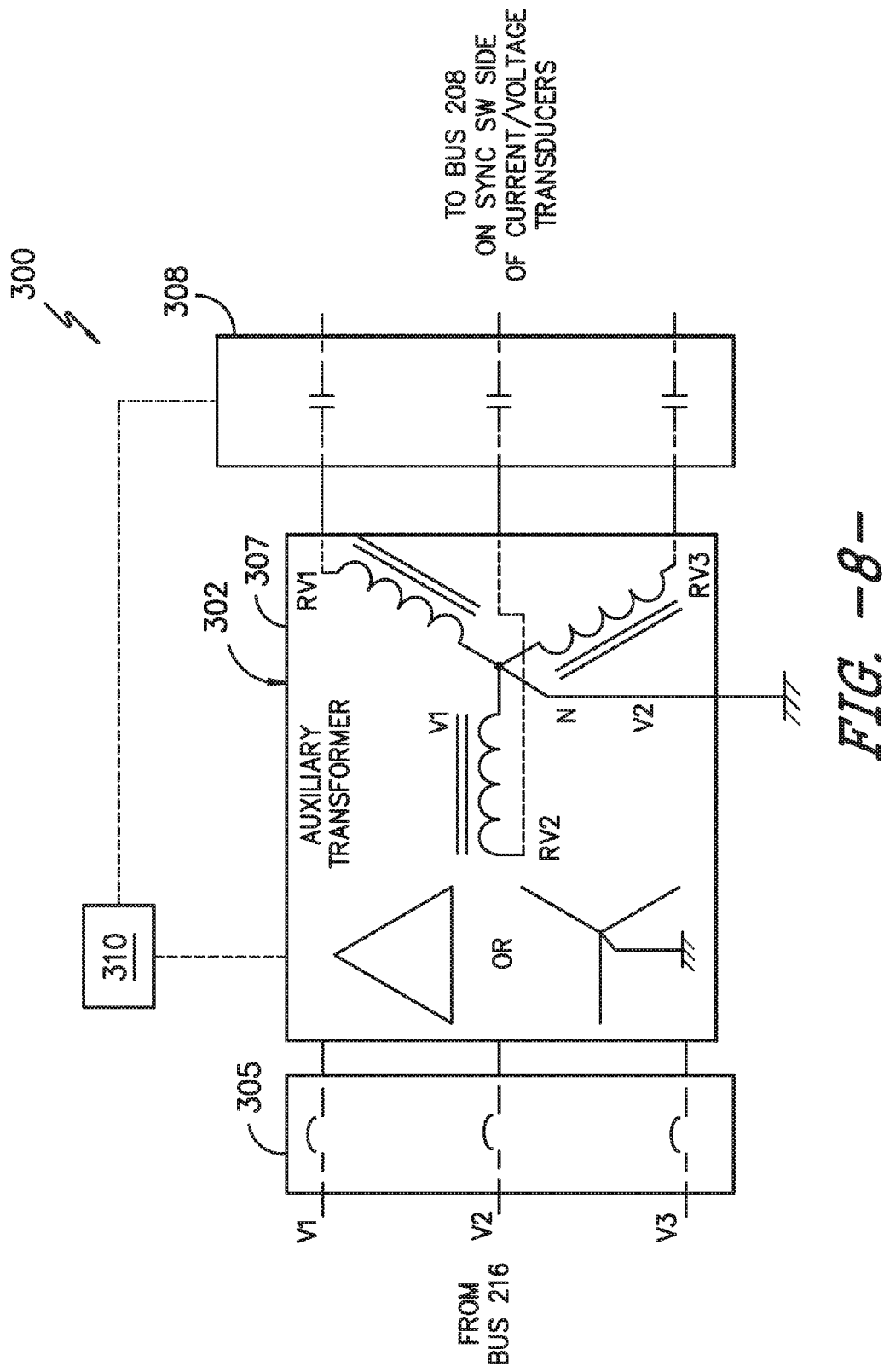
FIG. -8-

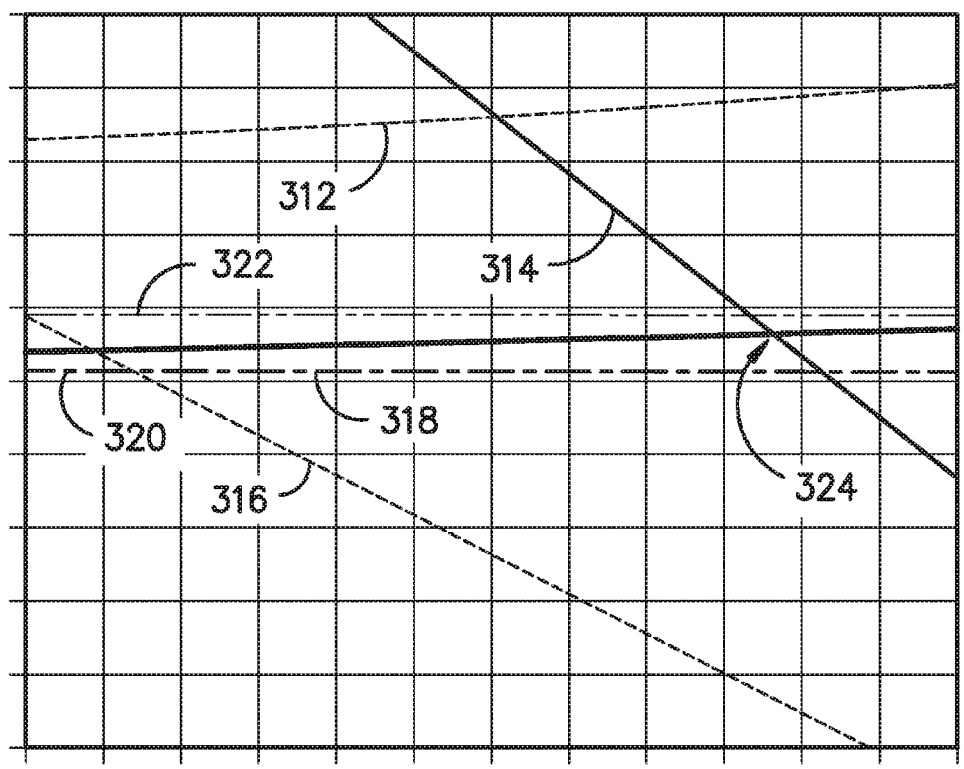
FIG. -9-

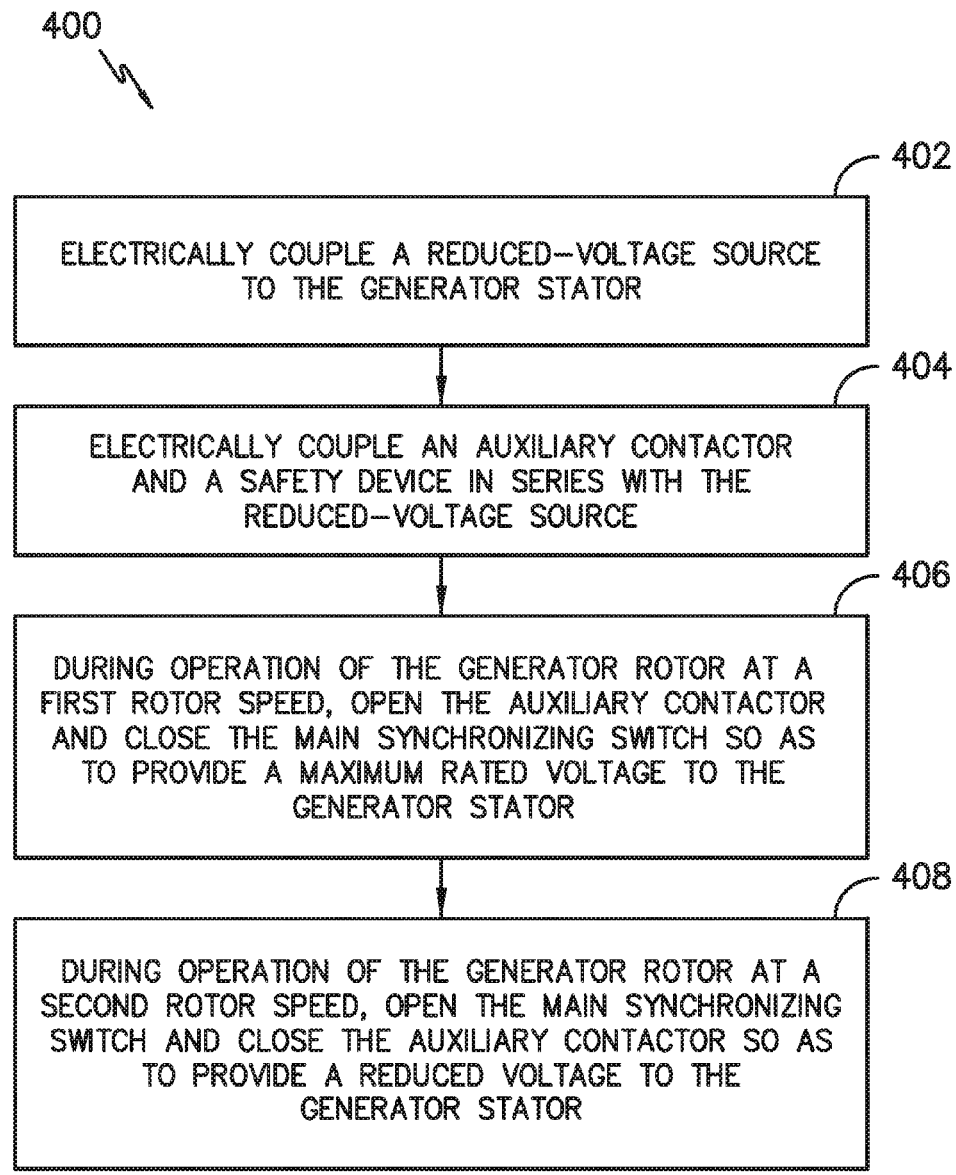
FIG. -10-

SYSTEM AND METHOD FOR CONTROLLING A GENERATOR

FIELD OF THE INVENTION

The present disclosure relates generally to wind turbines and, more particularly, to systems and methods for controlling a doubly fed induction generator (DFIG) of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, wind impacts the rotor blades and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. The high-speed shaft is generally rotatably coupled to a generator so as to rotatably drive a generator rotor. In many wind turbines, the generator may be a wound rotor, three-phase, double-fed induction (asynchronous) generator (DFIG) that includes a generator stator magnetically coupled to a generator rotor. As such, a rotating magnetic field may be induced by the generator rotor and a voltage may be induced within a generator stator that is magnetically coupled to the generator rotor. The associated electrical power can be transmitted to a main transformer that is typically connected to a power grid via a grid breaker. Thus, the main transformer steps up the voltage amplitude of the electrical power such that the transformed electrical power may be further transmitted to the power grid.

The rotor voltage of a DFIG is approximately proportional to the applied stator voltage, the slip frequency and the turns ratio of the DFIG. Further, the rotor voltage is also heavily affected by VAR production. Balancing the turns ratio and the current carrying capacity of the rotor circuit is an important design choice of the generator. For example, a high turns ratio reduces the current but increases the rotor circuit voltage that occurs with slip. In order to produce an economical turbine with a small power converter, the rotor turns ratio is selected to just accommodate a certain speed range, which minimizes the amount of current that must be used to produce rated power.

Based on historical sizing of DFIG machines, the typical turns ratio of a wind turbine produces a rated rotor voltage at sync speed +/−⅓ sync speed. For example, a 60 Hertz (Hz) machine will have a synchronous speed of 1200 rotations per minute (RPM). At ⅓ slip (i.e. 400 RPM slip), the rotor produces rated voltage, which corresponds to 800 RPM and 1600 RPM with 0 voltage at 1200 RPM for a 60 Hz machine. For a 50 Hz machine, synchronous speed will be approximately 1500 RPM. At ⅓ slip (i.e. 500 RPM slip), the rotor produces rated voltage, which corresponds to 1000 RPM and 2000 RPM with 0 voltage at 1500 RPM for a 50 Hz machine.

The consequence of this selection, however, is that at zero speed the rotor voltage would be three times the nominal voltage value (e.g. 2070V for a 690V power converter). Such a high voltage level at the rotor can severely damage the turbine electrical system. As such, it is imperative with a DFIG machine that the generator stator be de-energized when outside of its normal operating range.

Accordingly, an improved system and method for controlling a DFIG of a wind turbine that operates the generator stator at a reduced voltage (flux) to increase the speed range to allow more energy capture at low speed would be advantageous.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling a generator of an electrical power system. The generator includes a generator stator magnetically coupled to a generator rotor. The method includes operating the generator stator of the generator at a first voltage level. Another step includes monitoring, via one or more sensors, at least one of a rotor speed or a rotor voltage of the generator rotor. The method also includes reducing the first voltage level of the generator stator by a predetermined percentage when the rotor speed is within a low speed range or the rotor voltage exceeds a predetermined threshold so as to increase an operating range of the rotor speed. Thus, the increased operating range of the rotor speed increases power production of the electrical power system in the low speed range.

In one embodiment, the step of reducing the first voltage level of the generator stator may further include electrically disconnecting the generator stator from its normal full voltage source and coupling a reduced-voltage source to the generator stator. More specifically, in certain embodiments, the reduced-voltage source may include a low-voltage tap, a buck transformer, an autotransformer, an auxiliary transformer, or similar.

Thus, in particular embodiments, the method may include electrically coupling the low-voltage tap on the main transformer of the electrical power system. Alternatively, the method may include electrically coupling the auxiliary transformer between the main transformer and the generator stator. In additional embodiments, the method may further include electrically coupling at least one of an auxiliary contactor, one or more fuses, or at least one breaker in series with the reduced-voltage source.

In further embodiments, the first voltage level may correspond to a maximum rated voltage level. In another embodiment, the low speed range may include a range of less than about 1000 RPM for a 50-Hz application or a range of less than about 800 RPM for a 60-Hz application. In additional embodiments, the predetermined percentage may include any voltage less than the first voltage level to about one-third (⅓) of the first voltage level. More specifically, in certain embodiments, with a 3:1 turns ratio, a voltage level below one-third (⅓) of the first voltage level does not yield an additional low speed range because the voltage will be lower than rated voltage.

In yet another embodiment, the sensor(s) may include electric current or voltage sensors configured to generate one or more feedback signals of the electrical power circuit. In further embodiments, the electrical power circuit may be part of a wind turbine power system.

In another aspect, the present disclosure is directed to an electrical power system. The electrical power system includes a generator having a generator stator magnetically coupled to a generator rotor, one or more sensors for monitoring a rotor speed of the generator rotor, a reduced-voltage source electrically coupled to the generator stator, and a controller communicatively coupled to the generator, the sensor(s), and/or the reduced-voltage source. Further, the controller is configured to perform one or more operations, including but not limited to operating the generator stator at a first voltage level and reducing the first voltage level by a predetermined percentage when the rotor speed is within a low speed range so as to increase an operating range of the rotor speed. Thus, the increased operating range of the rotor speed increases power production of the electrical power system in the low speed range.

In yet another aspect, the present disclosure is directed to a method for controlling a generator of an electrical power system. The generator has a generator stator magnetically coupled to a generator rotor. Further, the generator stator is electrically coupled to a main transformer via a main synchronizing switch. The method includes opening the main synchronizing switch and electrically coupling a reduced-voltage source to the generator stator. Another step includes electrically coupling an auxiliary contactor in series with the reduced-voltage source. During operation of the generator rotor at a first rotor speed, the method also includes opening the auxiliary contactor and closing the main synchronizing switch so as to provide a maximum rated voltage level to the generator stator. During operation of the generator rotor at a second rotor speed, the method includes opening the main synchronizing switch and closing the auxiliary contactor so as to provide a reduced voltage to the stator. Further, the first rotor speed is greater than the second rotor speed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a portion of one embodiment of a wind turbine according to the present disclosure;

FIG. 2 illustrates a schematic view of one embodiment of an electrical and control system suitable for use with the wind turbine shown in FIG. 1;

FIG. 3 illustrates a block diagram of one embodiment of a controller suitable for use with the wind turbine shown in FIG. 1;

FIG. 4 illustrates a flow diagram of one embodiment of a method for controlling a generator stator of a generator of an electrical power system according to the present disclosure;

FIG. 5 illustrates a schematic diagram of one embodiment of a system for controlling a generator stator of a generator of an electrical power system according to the present disclosure;

FIG. 6 illustrates a schematic diagram of another embodiment of a system for controlling a generator stator of a generator of an electrical power system according to the present disclosure;

FIG. 7 illustrates a schematic diagram of yet another embodiment of a system for controlling a generator stator of a generator of an electrical power system according to the present disclosure;

FIG. 8 illustrates a schematic diagram of still another embodiment of a system for controlling a generator stator of a generator of an electrical power system according to the present disclosure;

FIG. 9 illustrates a graph of one embodiment of generator speed (x-axis) versus rotor voltage (y-axis) and rotor current (y-axis) according to the present disclosure; and FIG. 10 illustrates a flow diagram of another embodiment of a method for controlling a generator stator of a generator of an electrical power system according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for controlling a generator stator of a generator of an electrical power system to allow for more energy capture of the system at low speeds. Thus, the method includes operating the generator stator of the generator at a first voltage level and monitoring at least one of a rotor speed or a rotor voltage of the generator rotor. The method also includes reducing the first voltage level of the generator stator by a predetermined percentage when the rotor speed is within a low speed range or the rotor voltage exceeds a predetermined threshold so as to increase an operating range of the rotor speed. Thus, the increased operating range of the rotor speed increases power production of the electrical power system in the low speed range.

More specifically, with the increase in large rotor blades on the wind turbine, there is increased desire to capture more energy at lower wind speeds and a desire to operate the machine at a lower speed. The power requirements for a wind turbine produce power according to an aerodynamic curve with dramatically increasing power as wind speed increases. To produce optimum power, the speed of the rotor blades (and the generator with a fixed gear ratio) must also increase. Since low speed and low power occur simultaneously, operation at reduced voltage is possible even with a fraction of the current that would normally be produced at rated speed and rated power.

As an example (but not limited to these ratios), the stator voltage may be reduced to 50% when such rotor voltage would otherwise exceed rated voltage. The new operating range of the machine would be to produce full rated rotor voltage at ⅔ slip. In the previously described 60 Hz example, this would not occur until at a slip of 800 RPM which translates to an increased speed range of from 400 RPM to 2000 RPM for full rated rotor voltage. Application of the circuit would enable an extended speed range without a penalty for the normal operating range.

Thus, the present disclosure provides many advantages not present in the prior art. For example, the present disclosure allows for operation of standard DFIG machines at lower speeds without increasing machine losses at rated speed or machine size and/or adding conductors to the tower or switching circuit up-tower near the machine. Further, the present disclosure can be easily installed, particularly when installing low-voltage taps on the transformer, which is easier than high-voltage taps on the stator (i.e. requires more stator turns). In addition, the present disclosure may improve efficiency by reducing the DFIG machines magnetizing loss in the low speed range.

Referring now to the drawings, FIG. 1 illustrates a perspective view of a portion of an exemplary wind turbine 100 according to the present disclosure that is configured to implement the method and apparatus as described herein. The wind turbine 100 includes a nacelle 102 that typically houses a generator (not shown). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Referring to FIG. 2, a schematic view of an exemplary electrical and control system 200 that may be used with the wind turbine 100 is illustrated. During operation, wind impacts the blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122. In one embodiment, the generator 118 may be a wound rotor, three-phase, double-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In one embodiment, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a breaker-side bus 240, a grid circuit breaker 238, and a grid bus 242.

In addition, the electrical and control system 200 may include a wind turbine controller 202 configured to control any of the components of the wind turbine 100. For example, as shown particularly in FIG. 3, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 2. Further, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 258) may be communicatively coupled to the communications module 209 using any suitable means. For example, as shown in FIG. 3, the sensors 252, 254, 256, 258 may be coupled to the sensor interface 211 via a wired connection. However, in other embodiments, the sensors 252, 254, 256, 258 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 2, the generator stator 120 may be electrically coupled to a stator synchronizing switch 206 via a stator bus 208. In one embodiment, to facilitate the DFIG configuration, the generator rotor 122 is electrically coupled to a bi-directional power conversion assembly 210 or power converter via a rotor bus 212. Alternatively, the generator rotor 122 may be electrically coupled to the rotor bus 212 via any other device that facilitates operation of electrical and control system 200 as described herein. In a further embodiment, the stator synchronizing switch 206 may be electrically coupled to a main transformer circuit breaker 214 via a system bus 216.

The power conversion assembly 210 may include a rotor filter 218 that is electrically coupled to the generator rotor 122 via the rotor bus 212. A rotor filter bus 219 electrically couples the rotor filter 218 to a rotor-side power converter 220. Further, the rotor-side power converter 220 may be electrically coupled to a line-side power converter 222 via a single direct current (DC) link 244. Alternatively, the rotor-side power converter 220 and the line-side power converter 222 may be electrically coupled via individual and separate DC links. In addition, as shown, the DC link 244 may include a positive rail 246, a negative rail 248, and at least one capacitor 250 coupled therebetween.

In addition, a line-side power converter bus 223 may electrically couple the line-side power converter 222 to a line filter 224. Also, a line bus 225 may electrically couple the line filter 224 to a line contactor 226. Moreover, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

In operation, alternating current (AC) power generated at the generator stator 120 by rotation of the rotor 106 is provided via a dual path to the grid bus 242. The dual paths are defined by the stator bus 208 and the rotor bus 212. On the rotor bus side 212, sinusoidal multi-phase (e.g. three-phase) AC power is provided to the power conversion assembly 210. The rotor-side power converter 220 converts the AC power provided from the rotor bus 212 into DC power and provides the DC power to the DC link 244. Switching elements (e.g. IGBTs) used in bridge circuits of the rotor side power converter 220 can be modulated to convert the AC power provided from the rotor bus 212 into DC power suitable for the DC link 244.

The line side converter 222 converts the DC power on the DC link 244 into AC output power suitable for the electrical grid bus 242. In particular, switching elements (e.g. IGBTs) used in bridge circuits of the line side power converter 222 can be modulated to convert the DC power on the DC link 244 into AC power on the line side bus 225. The AC power from the power conversion assembly 210 can be combined with the power from the stator 120 to provide multi-phase power (e.g. three-phase power) having a frequency maintained substantially at the frequency of the electrical grid bus 242 (e.g. 50 Hz/60 Hz). It should be understood that the rotor-side power converter 220 and the line-side power converter 222 may have any configuration using any switching devices that facilitate operation of electrical and control system 200 as described herein.

Further, the power conversion assembly 210 may be coupled in electronic data communication with the turbine controller 202 and/or a separate or integral converter controller 262 to control the operation of the rotor-side power converter 220 and the line-side power converter 222. For example, during operation, the controller 202 may be configured to receive one or more voltage and/or electric current measurement signals from the first set of voltage and electric current sensors 252. Thus, the controller 202 may be configured to monitor and control at least some of the operational variables associated with the wind turbine 100 via the sensors 252. In the illustrated embodiment, each of the sensors 252 may be electrically coupled to each one of the three phases of the power grid bus 242. Alternatively, the sensors 252 may be electrically coupled to any portion of electrical and control system 200 that facilitates operation of electrical and control system 200 as described herein. In addition to the sensors described above, the sensors may also include a second set of voltage and electric current sensors 254, a third set of voltage and electric current sensors 256, a fourth set of voltage and electric current sensors 258 (all shown in FIG. 2), and/or any other suitable sensors.

It should also be understood that any number or type of voltage and/or electric current sensors may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art.

Thus, the converter controller 262 is configured to receive one or more voltage, electric current, and/or speed feedback signals from the sensors 252, 254, 256, 258. More specifically, in certain embodiments, the current or voltage feedback signals may include at least one of line current feedback signals, line-side converter feedback signals, rotor-side converter feedback signals, stator current feedback signals, line voltage feedback signals, or stator voltage feedback signals. For example, as shown in the illustrated embodiment, the converter controller 262 receives voltage and electric current measurement signals from the second set of voltage and electric current sensors 254 coupled in electronic data communication with stator bus 208. The converter controller 262 may also receive the third and fourth set of voltage and electric current measurement signals from the third and fourth set of voltage and electric current sensors 256, 258. In addition, the converter controller 262 may be configured with any of the features described herein in regards to the main controller 202. Further, the converter controller 262 may be separate from or integral with the main controller 202. As such, the converter controller 262 is configured to implement the various method steps as described herein and may be configured similar to the turbine controller 202.

Referring now to FIG. 4, a flow diagram of one embodiment of a method 350 for controlling a generator of an electrical power system (e.g. the generator 118 of the wind turbine power system 200 of FIG. 2) is illustrated. Similarly, FIGS. 5 and 6 illustrate schematic block diagrams of various components of a system 300 for controlling the generator 118 of the wind turbine power system 200 of FIG. 2. As shown at 352 of FIG. 4, the method 350 includes operating the generator stator 120 of the generator 118 at a first voltage level. For example, in certain embodiments, the first voltage level may correspond to a maximum rated voltage level.

As shown at 354, the method 350 includes monitoring a rotor speed or a rotor voltage (or any other parameter as a function of speed) of the generator rotor 122. More specifically, the rotor speed and/or rotor voltage may be monitored using the sensors 252, 254, 256, 258 as described herein. In additional embodiments, the rotor speed can also be measured by a tachometer mechanically coupled to the generator rotor 122 and electrically coupled to the control system. In additional embodiments, the method 350 may include adding hysteresis to the switch point.

As shown at 356, the method 350 also includes reducing the first voltage level of the generator stator 120 by a predetermined percentage when the rotor speed is within a low speed range or the rotor voltage exceeds a predetermined threshold so as to increase an operating range of the rotor speed. For example, in certain embodiments, the predetermined percentage may include any voltage less than the first voltage down to about one-third of the first voltage level, e.g. from about 30% to less than 100% of the first level voltage. In additional embodiments, the predetermined percentage may be less than one-third of the first voltage level. Further, in another embodiment, the low speed range may include a range of less than about 800 rotations per minute (RPM). Thus, the increased operating range of the rotor speed increases power production of the electrical power system 200 in the low speed range.

Referring to FIGS. 5-8, the first voltage level of the generator stator 120 may be reduced by electrically coupling a reduced-voltage source 302 to the generator stator 120. More specifically, as shown in FIG. 5, the reduced-voltage source 302 may include a low-voltage tap 304 electrically coupled to the generator stator 120. Further, as shown, RV1, RV2, and RV3 represent the reduced voltage taps of the main transformer's 234 secondary winding. In addition, V1, V2, and V3 represent the normal output voltages of the main transformer 234 (e.g. bus 236; FIG. 2). As used herein and generally understood in the art, a low-voltage tap generally refers to a connection point selection mechanism along a power transformer winding that allows a variable number of turns to be selected in discrete steps, thereby producing a transformer with a variable turns ratio which enables stepped voltage regulation of the output. Further, the tap selection may be made via an automatic or manual tap changer mechanism or may be a fixed tap. Thus, as shown in FIG. 5, the method 350 may include electrically coupling the low-voltage tap 304 on the main transformer 234 of the electrical power system 200. Thus, as shown, the method 350 may include electrically coupling the low-voltage tap 304 between the main transformer 234 and the generator stator 120.

Alternatively, as shown in FIG. 6, the reduced-voltage source 302 may include buck transformer 306. As used herein, a buck transformer generally refers to a type of transformer used to make adjustments to the voltage applied to alternating current equipment. Further, as shown in FIG. 6, RV1, RV2, and RV3 represent the reduced voltage taps of the buck transformer's 306 winding. In addition, V1, V2, and V3 represent the full voltage taps of the buck transformer 306 fed from the bus 216 through the safety device 305.

In addition, as shown in FIG. 7, the reduced-voltage source 302 may include an autotransformer 309. As used herein and generally understood in the art, an autotransformer generally refers to an electrical transformer having only one winding. Further, as shown in FIG. 7, RV1, RV2, and RV3 represent the reduced voltage taps of the autotransformer's 309 winding. In addition, V1, V2, and V3 represent the full voltage taps of the autotransformer 309 fed from the bus 216 through the safety device 305.

In still another embodiment, as shown in FIG. 8, the reduced-voltage source 302 may include an auxiliary or separate transformer 307. As shown, the auxiliary transformer 307 is fed full voltage (primary connections not shown). In certain embodiments, the primary winding may be a delta connection; however, the transformer arrangement may also be a Y-Y configuration or another other winding configuration. Further, as shown in FIG. 8, RV1, RV2, and RV3 represent the reduced voltage taps of the auxiliary transformer's 307 winding. In addition, V1, V2, and V3 represent the full voltage taps of the auxiliary transformer 307 fed from the bus 216 through the safety device 305.

Referring still to FIGS. 5-8, the method 350 may further include electrically coupling an auxiliary contactor 308 and the safety device 305 (e.g. one or more fuses and/or a breaker) in series with the reduced-voltage source 302. Thus, in certain embodiments, the auxiliary contactor 308 is configured to place the reduced-voltage source 302 electrically in parallel with the full voltage and the main/stator synchronizing switch 206. Further, in certain embodiments as shown in FIG. 8, RV1, RV2, and RV3 represent the reduced voltage taps of the auxiliary transformer's 307 winding. Moreover, V1, V2, and V3 represent the full voltage taps of the auxiliary transformer 307 fed from bus 216 through the safety device 305.

In addition, as shown, the system 300 may also include a controller 310 communicatively coupled to at least one of the generator 118, the sensor(s), and/or the reduced-voltage source 302. Thus, the controller 310 is configured to operate the generator stator 120 at a first voltage level and reduce the first voltage level by a predetermined percentage when the rotor speed is within a low speed range or the rotor voltage exceeds a predetermined threshold so as to increase an operating range of the rotor speed. Thus, the increased operating range of the rotor speed increases power production of the electrical power system in the low speed range.

More specifically, when running at high speed, the controller 310 is configured to close the stator synchronizing switch 206 which applies full voltage to the stator winding, thereby resulting in an optimum configuration of the machine for high power production. However, applying full voltage to the stator 120 can result in a high rotor circuit voltage at low speed (high slip frequency), which requires the generator stator 120 to be disconnected to avoid damage to the rotor circuit components. Thus, the controller 310 of the present disclosure allows the generator 118 to capture more energy at low speed. More specifically, when running at low speed, the controller 310 is configured to open the stator synchronizing switch 206 and close the auxiliary contactor 308, thereby applying reduced voltage to the stator 120. The reduced voltage causes reduced stator flux which translates to lower rotor voltage as a function of slip frequency. As such, the generator 118 is allowed to operate at a lower speed without damage to the rotor circuit. It should be understood that the controller 310 may be integral with the turbine controller 202 or the converter controller 262. Alternatively, the controller 310 may be configured similar to the turbine controller of FIG. 3. Further, the controller 310 may be separate or integral with controller 202.

Referring now to FIG. 9, a graph of one embodiment of generator speed (x-axis) versus rotor voltage (y-axis) and rotor current (y-axis) is illustrated. As shown, the graph illustrates various curves including rotor current at a reduced stator voltage 312, rotor voltage at a normal stator voltage 314, rotor voltage at a reduced stator voltage 316, and rotor current at normal stator voltage 318. Further, curves 320 and 322 illustrate the reduced rotor bridge threshold 320 and the rotor bridge maximum threshold 322, respectively. As such, the graph illustrates one example effect of the change in rotor voltage that will occur with a 2:1 voltage reduction in the stator voltage as illustrated at switch point 324. In such an embodiment, as shown, the minimum speed is reduced from about 1035 RPM to about 800 RPM.

Referring now to FIG. 10, a flow diagram of another embodiment of a method 350 for controlling a generator of an electrical power system (e.g. the generator 118 of the wind turbine power system 200 of FIG. 2) is illustrated. As shown at 402, the method 400 includes electrically coupling a reduced-voltage source 302 (e.g. a low-voltage tap 302 or an auxiliary transformer 307) to the generator stator 120. As shown at 404, the method 400 includes electrically coupling an auxiliary contactor 308 and a safety device 305 (such as fuses or a breaker) in series with the reduced-voltage source 302. As shown at 406, the method 400 includes closing the main synchronizing switch 206 and opening the auxiliary contactor 308 during operation of the generator rotor 122 at a first, higher rotor speed so as to provide a maximum rated voltage level to the generator stator 120. As shown at 408, the method 400 includes opening the main synchronizing switch 206 and closing the auxiliary contactor 308 during operation of the generator rotor 122 at a second, lower rotor speed so as to provide a reduced voltage to the stator 120.

More specifically, in certain embodiments, when first starting up the turbine 100, the turbine speed is ramped up from zero to cut-in speed. If the speed is below the switch point, the auxiliary contactor 308 can be closed while leaving open the main synchronizing switch 206 when the turbine 100 is synchronized (started). Afterwards, when the speed increases, the auxiliary contactor 308 can be opened and the main synchronizing switch 206 can be closed. As such, operation can be completed both ways, including switching from reduced voltage at low speed to full voltage at higher speed or switching from full voltage at higher speed to reduced voltage at lower speed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a generator of an electrical power system, the generator having a generator stator magnetically coupled to a generator rotor, the method comprising:
    operating the generator stator of the generator at a first voltage level;
    monitoring, via one or more sensors, at least one of a rotor speed or a rotor voltage of the generator rotor; and,
    electrically coupling a reduced-voltage source to the generator stator to reduce the first voltage level of the generator stator by a predetermined percentage when the rotor speed is within a low speed range or the rotor voltage exceeds a predetermined threshold so as to increase an operating range of the rotor speed, the low speed range comprising a range of less than 1000 rotations per minute (RPM),
    wherein the increased operating range of the rotor speed increases power production of the electrical power system in the low speed range.

2. The method of claim 1, wherein the reduced-voltage source comprises at least one of a low-voltage tap, a buck transformer, an autotransformer, or an auxiliary transformer.

3. The method of claim 2, further comprising electrically coupling the low-voltage tap on the main transformer of the electrical power system.

4. The method of claim 2, further comprising electrically coupling the reduced-voltage source between the main transformer and the generator stator.

5. The method of claim 1, further comprising electrically coupling an auxiliary contactor and a safety device in series with the reduced-voltage source.

6. The method of claim 1, wherein the first voltage level corresponds to a maximum rated voltage level.

7. The method of claim 1, wherein the low speed range comprises a range of less than 800 rotations per minute (RPM) for a 60-Hertz (Hz) system or a range of less than 1000 RPM for a 50-Hz system.

8. The method of claim 1, wherein the predetermined percentage comprises from less than 100% to 30% of the first voltage level.

9. The method of claim 1, wherein the one or more sensors comprises at least one of electric current or voltage sensors or a tachometer configured to generate one or more feedback signals of the electrical power circuit.

10. The method of claim 1, wherein the electrical power circuit is part of a wind turbine power system.

11. An electrical power system, comprising:
    a generator comprising a generator stator magnetically coupled to a generator rotor;
    one or more sensors for monitoring a rotor speed of the generator rotor;
    a reduced-voltage source coupled to the generator stator; and,
    a controller communicatively coupled to the generator, the one or more sensors, and the reduced-voltage source, the controller configured to perform one or more operations, the one or more operations comprising:
    operating the generator stator at a first voltage level, and electrically coupling the reduced-voltage source between the main transformer and the generator stator to reduce the first voltage level by a predetermined percentage when the rotor speed is within a low speed range so as to increase an operating range of the rotor speed, the low speed range comprising a range of less than 1000 rotations per minute (RPM),
    wherein the increased operating range of the rotor speed increases power production of the electrical power system in the low speed range.

12. The system of claim 11, wherein the reduced-voltage source comprises at least one of a low-voltage tap, a buck transformer, an auto transformer, or an auxiliary transformer.

13. The system of claim 12, wherein the low-voltage tap is electrically coupled on the main transformer of the electrical power system.

14. The system of claim 11, further comprising electrically coupling an auxiliary contactor and a safety device in series with the reduced-voltage source.

15. The system of claim 11, wherein the first voltage level corresponds to a maximum rated voltage level.

16. The system of claim 11, wherein the low speed range comprises a range of less than 800 rotations per minute (RPM) for a 60-Hertz (Hz) system or a range of less than 1000 RPM for a 50-Hz system.

17. The system of claim 11, wherein the predetermined percentage comprises from less than 100% to 30% of the first voltage level.

18. A method for controlling a generator of an electrical power system, the generator having a generator stator magnetically coupled to a generator rotor, the generator stator electrically coupled to a main transformer via a main synchronizing switch, the method comprising:
    electrically coupling a reduced-voltage source to the generator stator;
    electrically coupling an auxiliary contactor and a safety device in series to the reduced-voltage source;
    during operation of the generator rotor at a first rotor speed, opening the auxiliary contactor and closing the main synchronizing switch so as to provide a maximum rated voltage level to the generator stator; and,
    during operation of the generator rotor at a second rotor speed, opening the main synchronizing switch and closing the auxiliary contactor so as to provide a reduced voltage to the stator, wherein the first rotor speed is greater than the second rotor speed.

* * * * *